United States Patent [19]

Inada et al.

[11] Patent Number: 4,981,699
[45] Date of Patent: Jan. 1, 1991

[54] METHOD OF PREPARING AN EDIBLE COMPOSITION AND PRODUCT RESULTING THEREFROM

[75] Inventors: Shoshichiro Inada, Amagasaki; Reikichi Yanai, Osaka; Johji Ogasawara, Kobe; Yoshikazu Tsubakimoto; Kazuhiro Hamatani, both of Kakogawa; Masakazu Takahashi, Kobe, all of Japan

[73] Assignee: Seitetsu Kagaku Co., Ltd., Hyogo, Japan

[21] Appl. No.: 501,307

[22] Filed: Mar. 23, 1990

Related U.S. Application Data

[63] Continuation of Ser. No. 166,500, Mar. 10, 1988, abandoned.

[30] Foreign Application Priority Data

Mar. 20, 1987 [JP] Japan .................................. 62-66918
Aug. 21, 1987 [JP] Japan .................................. 62-208501
Sep. 16, 1987 [JP] Japan .................................. 62-233268

[51] Int. Cl.$^5$ ............................................. A23L 1/221
[52] U.S. Cl. ........................................ 426/7; 426/44; 426/45; 426/46; 426/52; 426/56; 426/51; 426/655; 426/650; 426/422; 426/424; 426/425; 426/431; 426/432; 426/437; 426/657

[58] Field of Search ............... 426/652, 655, 653, 643, 426/656, 657, 650, 44, 7, 45, 46, 52, 56, 51, 422, 424, 425, 431, 432, 437

[56] References Cited

U.S. PATENT DOCUMENTS

| | | | |
|---|---|---|---|
| 4,376,132 | 3/1983 | Eguchi et al. | 426/655 |
| 4,714,791 | 12/1987 | Inada | 568/913 |
| 4,770,894 | 9/1988 | Usiu et al. | 426/655 |

FOREIGN PATENT DOCUMENTS

| | | | |
|---|---|---|---|
| 0132562 | 10/1978 | Fed. Rep. of Germany | 426/655 |
| 0073173 | 3/1983 | France | 426/655 |
| 0205958 | 11/1984 | Japan | 426/655 |

*Primary Examiner*—Marianne Cintins

[57] ABSTRACT

The edible composition having improved water solubility and dispersibility of a useful hydrophobic edible material obtained from an animal or plant natural raw material, improved absorption of the hydrophobic edible material into the body, as well as improved taste and palatability, which comprises the hydrophobic edible material and a water soluble ingredient selected from the group consisting of water soluble low molecular weight peptides, water soluble concentrated extracts and mixtures thereof.

21 Claims, 2 Drawing Sheets

1

METHOD OF PREPARING AN EDIBLE COMPOSITION AND PRODUCT RESULTING THEREFROM

This application is a continuation of application Ser. No. 07/166,500, filed Mar. 10, 1988, now abandoned.

FIELD OF THE INVENTION

The present invention relates to an edible composition. More particularly, the edible composition of the present invention comprises a useful hydrophobic edible material obtained from an animal or plant natural raw material and a water soluble ingredient selected from the group consisting of water soluble low molecular weight peptides, water soluble concentrated extracts and mixtures thereof, which has improved water solubility and dispersibility of the hydrophobic edible material and thereby improved absorption thereof into the body, as well as improved taste and palatability.

The edible composition of the present invention can be used as an additive for food and food per se.

BACKGROUND OF THE INVENTION

Animal and plant natural raw materials for food contain many useful hydrophobic edible materials. Usually, these hydrophobic edible materials are separated from raw materials by, for example, extraction and, optionally, concentrated and then consumed as food or their additives. However, due to hydrophobic nature, most of them have no or little water solubility and dispersibility, which results in low absorption into the body.

Further, there are many hydrophobic edible materials which are valuable not only from the nutritional viewpoint but also from medical and health viewpoints. However, many of them have inferior taste and palatability and are not suitable for food or their additives.

The present inventors have endeavored to improve water solubility and dispersibility of these hydrophobic edible materials and thereby to improve absorption thereof in the body as well as to improve their taste and palatability. As result, it has been found that, when a water soluble ingredient selected from the group consisting of water soluble low molecular weight peptides, water soluble concentrated extracts and mixtures thereof are admixed with hydrophobic edible materials, particularly, those obtained by extraction with a fluid at subcritical or supercritical conditions, water solubility and dispersibility of the hydrophobic edible materials and absorption thereof into the body as well as taste and palatability are remarkably improved.

Extraction of hydrophobic edible materials by using subcritical or supercritical conditions is known. For example, Japanese Patent Kokoku No. 51-33185 discloses extraction of coffee oil from roasted coffee beans. Japanese Patent Kokoku No. 54-10539 discloses a fundamental technique of extraction of using a fluid at subcritical or supercritical conditions. Further, Japanese Patent Kokoku No. 55-16200 discloses extraction of fats and oils from animal or plant raw materials by using a fluid at subcritical or supercritical conditions. Angew. Chem. Int. Ed. Engl. 17, 716-727 (1978) discloses a review of extraction with a fluid at subcritical and supercritical conditions. U.S. Pat. No. 4,714,791 of the present applicant (the assignee of the present application) also discloses the production of aliphatic higher alcohols by using a fluid at subcritical and supercritical conditions. U.S. patent application Ser. No. 078,189 of the present applicant discloses a method for treating glycosides with a fluid at subcritical and supercritical conditions. However, the prior art does not teach improvement of water solubility and dispersibility or improvement of taste and palatability of hydrophobic edible materials by addition of the above water soluble ingredient.

OBJECTS OF THE INVENTION

One object of the present invention is to provide an edible composition of a hydrophobic edible material which has improved water solubility and dispersibility and thereby improved absorption into the body.

Another object of the present invention is to provide an edible composition of a hydrophobic edible material which has improved taste and palatability.

These objects as well as other objects and advantages of the present invention will become apparent from the following description by reference to the accompanying drawings.

SUMMARY OF THE INVENTION

Figure 1:
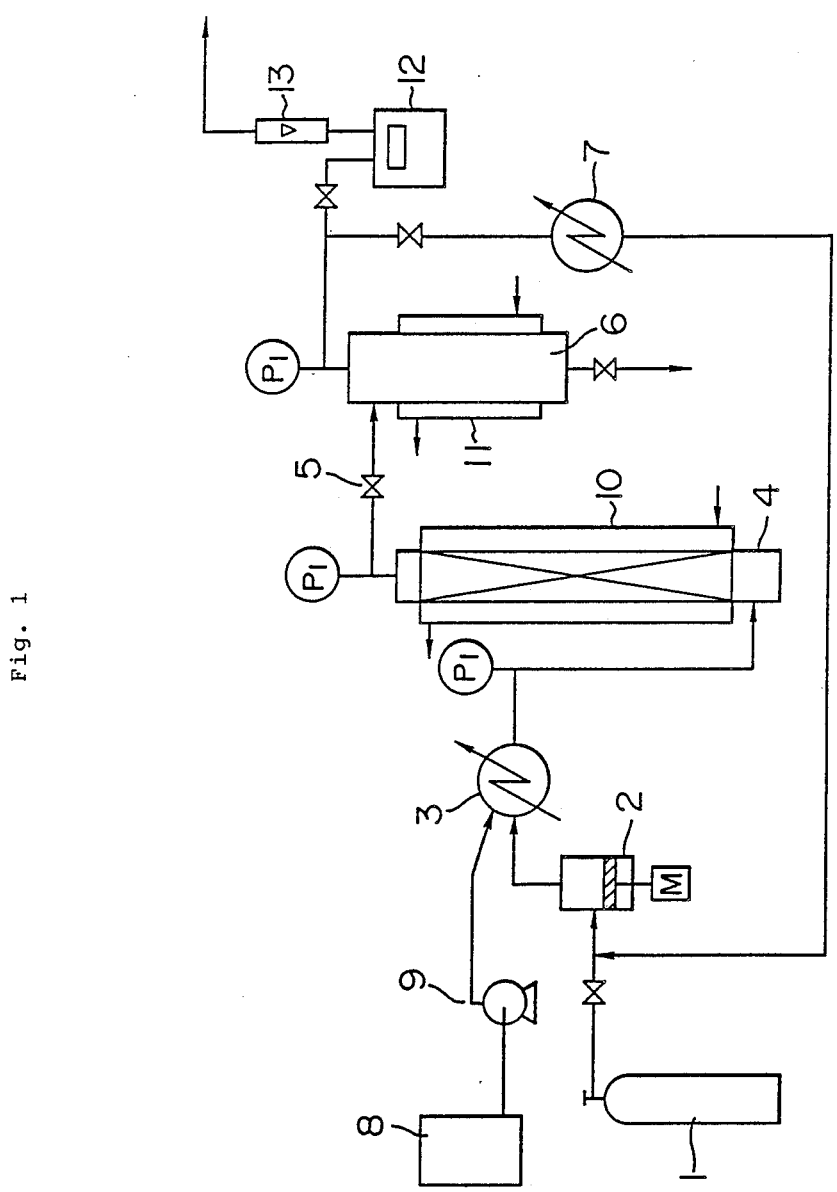
FIG. 1 is a schematic flow sheet of extraction with a fluid at subcritical or supercritical conditions.

According to the present invention, there is provided an edible composition which comprises a useful hydrophobic edible material obtained from an animal or plant natural raw material and a water soluble ingredient selected from the group consisting of water soluble low molecular weight peptides, water soluble concentrated extracts and mixtures thereof. Preferably, in the composition of the present invention, the hydrophobic edible material is that obtained by extraction with a fluid at subcritical or supercritical conditions because it has been found that water solubility or dispersion of the composition is more improved by using such a water soluble ingredient, even if no surfactant is added. However, in the present invention, one or more surfactants can be also added to the composition to improve its water solubility or dispersibility.

DETAILED DESCRIPTION OF THE INVENTION

The edible composition of the present invention can be used as food such as health food, nutrition supplemental food, and food additives such as those for ordinary food, instant food (e.g., instant food, convenience food, quick serve meals, frozen prepared food, ready to eat food), beverages and the like. Further, the composition of the present invention can be used as feed for animals or additives thereto.

Examples of the useful hydrophobic edible material obtained from an animal or plant natural raw material of the present invention include higher alcohols such as normal aliphatic higher alcohols having 24 to 34 carbon atoms and the like; waxes such as bees wax, rice wax and the like; plant oils such as soybean oil, cottonseed oil, coffee bean oil and the like; animal fats and oils such as fish oil, tallow, lard, chicken oil and the like; oil soluble vitamins such as vitamins A, D, E, K and the like; pigments such as carotenoid pigments, naphthoquinoline pigments and the like; terpenoids; alkaloids; steroids; various flavors such as coffee flavor, so-called "katsuo-bushi (smoke-dried bonito)" flavor, orange essential oil, lemon essential oil, vanilla essential oil, ginger essential oil, spices, seasonings and the like; fatty acids such as eicosapentenoic acid, docosahexenoic acid, γ-linolenic acid and the like; and other hydrocarbons having physiological activity.

In the present invention, the method for obtaining the hydrophobic edible material from its raw material is not specifically limited as far as the edible material is efficiently obtained with minimum impairment, and various methods can be employed. For example, the edible material can be obtained by extracting its raw material with an organic solvent such as n-hexane, ethanol or the like, and then distilling off the solvent, or by subjecting its raw material to pressing, steaming, grinding, filtering, concentrating or the like to concentrate the edible material. Alternatively, the edible material can be obtained by directly extracting its raw material with a fluid such as $CO_2$, ethylene, ammonia, $N_2O$, propane, water or the like at subcritical or supercritical conditions or, in the case that subcritical or supercritical conditions are not suitable for extraction of edible material from the economical viewpoint, by firstly extracting its raw material with an organic solvent such as above and then removing all the solvent used or the solvent remaining in the extracted edible material with a fluid at subcritical or supercritical conditions.

In view of improvement of water solubility and dispersibility, it is preferred to use a fluid at subcritical or supercritical conditions, particularly, $CO_2$.

The fluid at subcritical or supercritical conditions is that at about or beyond the critical temperature and the critical pressure. For example, $CO_2$ at subcritical or supercritical conditions is in the state at about or beyond its critical point (31.0° C., 72.9 atm), and has a density close to a liquid as well as a large diffusion coefficient close to a gas. Because of these properties, the fluid can efficiently extract a large amount of various compounds quickly. Further, separation of the fluid from an extract can be readily effected by slightly changing pressure or temperature. Particularly, $CO_2$ is suitable for the purpose of the present invention because the treatment can be effected at a relatively low temperature under inert atmosphere and bacteriostatic or sterilization effect can be expected.

One embodiment of extraction with $CO_2$ at subcritical or supercritical conditions is illustrated by using FIG. 1.

FIG. 1 is a flow sheet of a batchwise extraction with $CO_2$ at subcritical or supercritical conditions.

In FIG. 1, $CO_2$ from a $CO_2$ cylinder (1) is compressed to a predetermined pressure by a compressor (2), passed through a heat exchanger (3) to heat the compressed $CO_2$ to a predetermined extraction temperature in a subcritical or supercritical state, and led to an extractor (4) provided with a heating jacket (10) to adjust the extraction temperature. In the extractor (4), a raw material or a solvent containing hydrophobic edible material obtained by solvent extraction is charged and contacted with the $CO_2$ to effect extraction or to remove the solvent. Then, the $CO_2$ phase containing the hydrophobic edible material extracted is passed through a pressure-reducing valve (5) and led to a separator (6) provided with a heating jacket (11) to adjust to the separation temperature, where the hydrophobic edible material is separated from the $CO_2$. The $CO_2$ separated from the edible material is cooled and liquefied in a condenser (7) and recycled to the compressor (2). When an entrainer is used, the entrainer can be mixed into the raw material or the solvent containing edible material obtained by solvent extraction in advance, and then it is charged into the extractor (4), or a predetermined amount of an entrainer from an entrainer holder (8) is led to the heat exchanger (3) by a pump (9). When the extractant is used in one way, the amount of discharged gas is controlled by a flow rate integrator (12) and a flow meter (13). In the extractor (4), the extraction or removal of the solvent is carried out under a $CO_2$ pressure of 50 to 500 kg/cm$^2$G, preferably 60 to 300 kg/cm$^2$G, and a temperature of 25° to 100° C., preferably 25° to 70° C.

In the separataor (6), a better result can be obtained when the hydrophobic edible material is separated from $CO_2$ at a pressure of 1 to 200 kg/cm$^2$G and a temperature of 30° to 100° C.

In the present invention, the hydrophobic edible material is admixed with a water soluble ingredient selected from the group consisting of water soluble low molecular weight peptides, water soluble concentrated extracts and mixtures thereof.

The water soluble low molecular weight peptide is preferably that having a molecular weight not higher than 10,000 in view of its function for improving water solubility or dispersibility of the hydrophobic edible material as well as for preventing adverse effects of a peptide such as allergy. It is presumed that the water soluble low molecular weight peptide has a surface active function and is appropriately entangled with the hydrophobic edible material to accelerate its dispersion in an aqueous solution and thereby absorption thereof into body cells is improved according to a manner similar to enhancement of intake of an amino acid into body cells.

The water soluble concentrated extract is a concentrate of one or more water soluble components obtained from various animal and plant raw materials by pressing or extraction with water or hot water. In general, a water soluble extract from an animal or plant raw material contains many taste components and water soluble effective components derived from the raw material. For example, such an extract contains various glycosides, monoglycerides and phospholipids which have surface active functions. It is presumed that these components are concentrated in the water soluble concentrated extract and are appropriately entangled with the hydrophobic edible material to exert their inherent surface active functions synergistically to accelerate dispersion of the hydrophobic edible material in an aqueous solution.

These water soluble ingredients also contain various components having physiological activities and such components are also utilized in the composition of the present invention. Further, these water soluble ingredients have good taste and palatability and therefore they can improve taste and palatability of the hydrophobic edible material.

Examples of the water soluble low molecular weight peptide and the water soluble concentrated extract include those obtained from various animal and plant raw materials such as fish and shellfish (e.g., sardine, mackerel, saurel, bonito, oyster, clam, abalone, etc.), seaweed (e.g., kelp, laver, etc.), meat (e.g., beef, pork, chicken, etc.), fruits and juice (e.g., peach, apple, grape, orange, lemon, grapefruit, etc.), and vegetables (tomato, carrot, cabbage, onion, red pepper, etc.), plant seeds (coffee, soy beans, rice, corn, peanut, cottonseed, etc.), plant roots (ginseng, licorice, kudzu (pueraria), peony, etc.), spices and seasonings. They can be obtained from their raw materials by conventional methods. For example, the water soluble low molecular weight peptide can be obtained by enzymatic hydrolysis of its raw material according to, for example, the methods disclosed in Japanese Patent Kokoku No. 53-7508 and Japanese Patent Kokai No. 59-161319. The water soluble concentrated extract can be obtained by pressing of its raw materials, or extraction of its raw material with water or hot water and then concentration of the resultant extract. This concentration can be also effected according to conventional methods such as concentration under reduced pressure, concentration by using an ultrafilter, freeze-concentration, evaporation or the like. Although a unique taste component of a raw material may be lost by this concentration, said taste can be desirably supplemented by aroma and flavor components derived from the hydrophobic edible material contained in the composition of the present invention. On the other hand, by this concentration, the water content is reduced and therefore growth of putrefactive microorganisms is inhibited to improve preservation and hygienic qualities.

These water soluble ingredients can be used alone or in combination. A particular kind of water soluble ingredient to be used can be appropriately chosen according to particular kind of its raw material and the hydrophobic edible material and from the economical viewpoint. In the case that the raw material of the water soluble ingredient is rich in protein, it is advantageous to use the water soluble low molecular weight peptide having a high nutritive value obtained by enzymatic hydrolysis as described hereinafter. On the other hand, in the case that the raw material is not rich in protein, or is rich in water soluble components, it is advantageous to use the water soluble concentrated extract.

For example, in the case that the raw material of the water soluble ingredient is that being rich in protein such as fish meat, chicken, soybeans or the like, protein can be hydrolyzed and solubilized to obtain a water soluble low molecular weight peptide. On the other hand, in the case that the raw material contains less protein and is rich in water soluble taste components such as roasted coffee beans, tea, "katsuo-bushi", plants or the like, the water soluble components can be extracted with water or hot water to obtain a water soluble concentrated extract.

Further, among the water soluble low molecular weight peptides, there are known those having physiological activities such as anti-ulcer activity, anti-hyperlipemia, insulin-like activity and the like (Japanese Patent Kokai No. 59-161319, U.S. Pat. No. 4,584,197). In this respect, these water soluble low molecular weight peptides are more preferable than the water soluble concentrated extracts. However, many of the water soluble concentrated extracts provide better taste and flavor in comparison with the water soluble low molecular weight peptides. Furthermore, in view of improvement of nutritive value and taste, it is also advantageous to use the water soluble low molecular weight peptide together with the water soluble concentrated extract to obtain the edible composition having characteristics of both water soluble ingredients.

The edible composition of the present invention can be prepared by admixing the hydrophobic edible material and the water soluble ingredient and can be obtained in the form of a paste, concentrated and diluted liquid preparations, powder, granules or the like according to known method. The amounts and the ratio of the hydrophobic edible material and the water soluble ingredient in the composition are not specifically limited but, in general, the hydrophobic edible material is present in the composition in an amount of 0.0001% to 50% by weight based on the total weight of the composition.

Optionally, the edible composition of the present invention can contain one or more other ingredients such as surfactants, preservatives, antioxidants, excipients including water, colorants, additional flavors and the like. Particularly, as described above, the edible composition of the present invention can contain one or more surfactants for food such as propylene glycol esters, monoglycerides, sorbitan esters, sugar fatty acid esters, polyglycerine ester, lecithin and the like to further improve water solubility or dispersibility. Further, in order to improve shelf life, the composition can contain ethanol, tocopherol and the like. The amount of these ingredients are obvious to those skilled in the art and can be chosen according to the particular kind of the desired composition.

The following examples and comparative examples further illustrate the present invention in detail but are not to be construed to limit the scope thereof. All %'s in the examples and comparative examples are by weight, unless otherwise stated.

EXAMPLES 1 TO 4 AND COMPARATIVE EXAMPLE 1

A dried filter cake (2,000 g) obtained from a lime-clarifying process of sugar production from sugarcane was extracted with supercritical $CO_2$ at a temperature of 39° C. under the pressure of 250 kg/cm$^2$ according to the process as described with respect to FIG. 1 and the extract was separated from $CO_2$ under the conditions of temperatures of 35° C. and pressure of 140 kg/cm$^2$ to obtain white powder (14 g). The powder was a mixture of higher alcohols containing octacosanol (59%) and triacontanol (3%).

Separately, mackerel meat was enzymatically hydrolyzed at 60° C. for 2 hours by using a commercially available protease preparation to obtain a mackerel peptide extract paste having the water content of 32% (yield: 22%).

According to the formulations shown in Table 1, edible compositions were prepared by admixing the above powder of the mixture of higher alcohols (A), the mackerel peptide extract (B) and/or a commercially available sugar fatty acid ester (C: Ryoto-Sugar Ester S-1570 manufactured by Mitsubishi Kasei Shokuhin K.K., Japan) and adding water to the mixture to adjust the total volume to 100 ml. Water dispersibility of each composition was evaluated according to the following criteria.

O: stable aqueous solution
Δ: slight floats
×: no dispersion

The results are shown in Table 1.

TABLE 1

| Ex. No. | Formulation (%) | | | Dispersibility Period after preparation | | | | |
|---|---|---|---|---|---|---|---|---|
| | A | B | C | 0 hrs. | 24 hrs. | 48 hrs. | 1 week | 1 month |
| Ex. 1 | 1.0 | 40 | — | O | O | O | O | Δ |
| Ex. 2 | 1.0 | 20 | — | O | Δ | Δ | Δ | Δ |
| Ex. 3 | 1.0 | 40 | 0.1 | O | O | O | O | O |
| Ex. 4 | 1.0 | 20 | 0.1 | O | O | O | O | O |
| Comp. | 1.0 | — | 0.1 | Δ | X | X | X | X |

TABLE 1-continued

| Ex. No. | Formulation (%) A | B | C | Dispersibility Period after preparation 0 hrs. | 24 hrs. | 48 hrs. | 1 week | 1 month |
|---|---|---|---|---|---|---|---|---|
| Ex. 1 | | | | | | | | |

As seen from Table 1, water dispersibility of the hydrophobic mixture of higher alcohols (A) ca be improved by admixing with the mackerel peptide extract (B) alone or in combination with the sugar fatty acid ester (C). On the other hand, when the hydrophobic mixture (A) is merely admixed with the sugar fatty acid ester (C), water dispersibility is not improved. Thus, it is clear that the addition of the water soluble peptide extract (B) is very effective for improvement of water dispersibility.

EXAMPLE 5

According to the formulations shown in Table 2, feed compositions were prepared. The extract in Table 2 was the hydrophobic extract obtained from the filter cake according to the same manner as described in the above Examples 1 to 4.

TABLE 2

| Ingredients | Amounts (%) A | B | C |
|---|---|---|---|
| Casein | 20.0 | 20.0 | 20.0 |
| Corn oil | 5.0 | 5.0 | 5.0 |
| Starch | 62.0 | 64.7 | 61.7 |
| Fibers | 5.0 | 5.0 | 5.0 |
| Minerals | 3.5 | 3.5 | 3.5 |
| Vitamins | 1.0 | 1.0 | 1.0 |
| Choline chloride | 0.2 | 0.2 | 0.2 |
| Extract | — | 0.3 | 0.3 |
| Mackerel peptide | 3.0 | — | 3.0 |

Mice (1 month old) were pre-bred for one week to learn to swim under the following conditions.
Water pool: 26 cm × 58 cm × 35 cm
Depth: 15 cm
Water temperature: 30° C.
Swimming duration time: 30 minutes Mice having similar capacity for locomotion were chosen and divided into 3 groups (10 mice per group). Mice of A group were fed with the above composition A. Likewise, mice of B and C groups were fed with the compositions B and C, respectively. Mice were permitted free access to the compositions.

Once a week, the swimming duration time of mice was measured by using the above water pool and the limit swimming time was determined. The limit swimming time was defined as the swimming duration time until the mouse sunk in water, breathed out air from the nostril or the mouth as bubbles and could not float.

Figure 2:
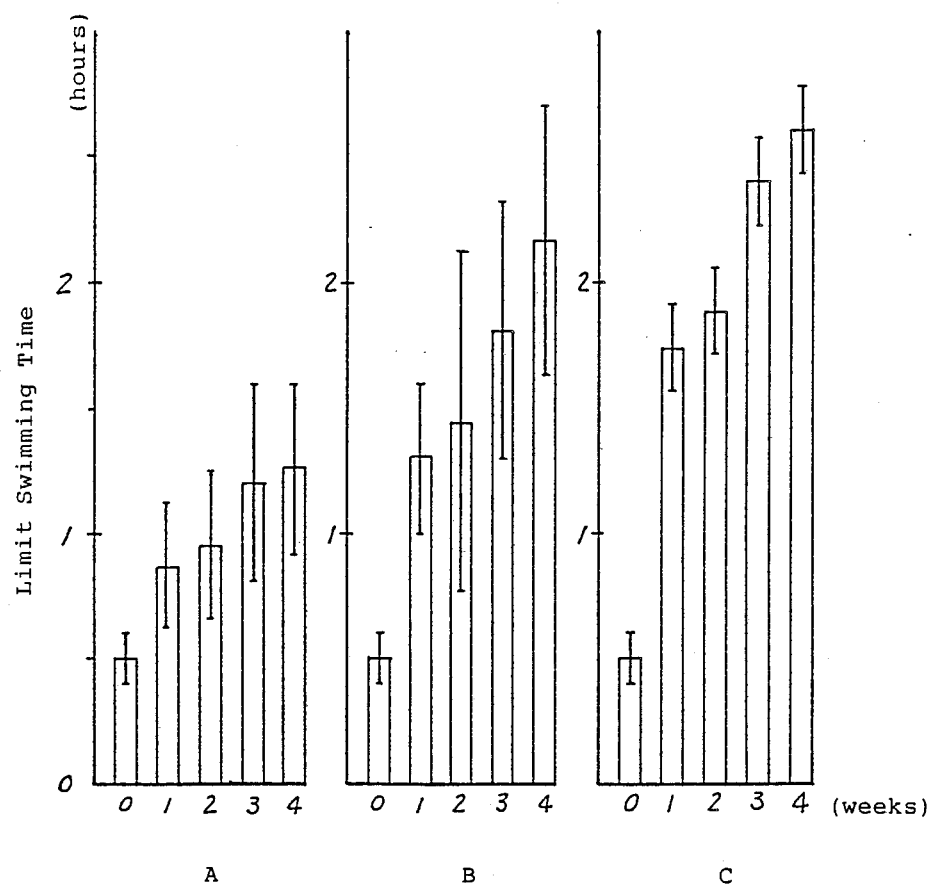
FIG. 2 is a graph illustrating the relation between the ingestion period (weeks) and the limit swimming time (hours) as disclosed in Example 5 hereinafter.

The results are shown in FIG. 2. As seen from FIG. 2, in comparison with A group (control), the limit swimming time of B and C groups are remarkably increased. Particularly, the result of C group wherein the mice take the composition C containing mackerel peptide show less individual difference and superior to those of B group.

It is considered that these results show the improvement of absorption of the higher alcohols into the body.

EXAMPLE 6

Gills and fins of silver salmon (3,000 g) stored at a temperature of 2° C. to −4° C. were extracted with supercritical $CO_2$ at the temperature of 40° C. under the pressure of 240 kg/cm$^2$ and the extract was separated at room temperature under the atmospheric pressure to obtain salmon oil in salmon pink (340 g) having good flavor.

The salmon oil (10 g) thus obtained was admixed with mackerel peptide as obtained in Examples 1 to 4 (90 g) to obtain a salmon oil extract for soup (100 g). The extract had very good flavor and was suitable for a soup of "Ishikari-nabe" (Japanese hot dish of salmon served in a pot with vegetables, "tofu", etc.).

Further, in order to provide additional taste, the extract was diluted with 20-fold mackerel peptide obtained in the same manner as described in Example 1, and a vinegar brewed from cereals was added to the mixture in an amount of 2% based on the total weight of the final product to obtain a concentrated liquid salmon flavor.

This concentrated liquid preparation has very good taste and can be used for flavoring various food.

EXAMPLE 7

Skins (500 g) obtained from evisceration of broiler meat stored by freezing were extracted with supercritical $CO_2$ at temperature of 35° C. under the pressure of 200 kg/cm$^2$ and the extract was separated at room temperature under the atmospheric pressure to obtain an oily extract of chicken oil (186 g).

The extract (1 g) was admixed with the above mackerel peptide (99 g) to obtain an extract for chicken soup (100 g). This was further diluted with 20-fold mackerel peptide and a vinegar brewed from cereals was added to the mixture in an amount of 2% based on the total weight of the final product to obtain a concentrated liquid chicken flavor.

By diluting the liquid preparation with 50 to 100-fold water or hot water, a soup which can be used for various dishes is prepared. Further, a soup for chinese noodles is prepared by adding soy sauce, lard, sesame oil, salt and other various extracts to the concentrated liquid chicken flavor and diluting with water.

EXAMPLES 8 TO 10 AND COMPARATIVE EXAMPLE 2

Coarsely ground roasted coffee beans (1,200 g) were extracted with subcritical $CO_2$ at a temperature of 29° C. under a pressure of 130 kg/cm$^2$ and the extract was separated at room temperature under atmospheric pressure to obtain an oily coffee flavor (38 g).

The remaining coarsely ground roasted coffee residue (1,000 g) was extracted with hot water at 95° C. for 2 hours to obtain a water soluble extract and the extract was concentrated under reduced pressure to obtain a concentrated extract in the form of a paste contained 40% of water (yield: 26%).

According to the formulations shown in Table 3, edible compositions were prepared by admixing the above oily coffee flavor (A), the above concentrated extract (B) and/or a commercially available sugar fatty acid ester (C: RyotoSugar Ester S-1570) and adding water to the mixture to adjust the total volume to 100 ml. Water dispersibility of each composition was evaluated according to the following criteria.

O: stable aqueous solution
Δ: slight separation of oil layer
×: separation into two layer The results are shown in Table 3.

TABLE 3

| Ex. No. | Formulation (%) A | B | C | Dispersibility Period after preparation 0 hr. | 24 hrs. | 48 hrs. | 1 week | 1 month |
|---|---|---|---|---|---|---|---|---|
| Ex. 8 | 1.0 | 10 | — | O | O | Δ | X | X |
| Ex. 9 | 1.0 | 10 | 0.1 | O | O | O | O | O |
| Ex. 10 | 1.0 | 4 | 0.1 | O | O | O | O | O |
| Comp. Ex. 2 | 1.0 | — | 0.1 | Δ | X | X | X | X |

As seen from Table 3, a stable concentrated liquid coffee flavor can be obtained by addition of the water soluble concentrated extract and a small amount of the sugar fatty acid ester. Further, by using the sugar fatty acid ester, the amount of the water soluble concentrated extract can be reduced to improve flavor. However, in the case of using the sugar fatty acid ester alone, water dispersibility of the liquid coffee flavor cannot be improved.

A small amount of the concentrated liquid coffee flavor thus obtained was added to instant coffee, canned coffee or the like to get coffee beverages with improved flavor and palatability. Instead of the sugar fatty acid ester, there can be also used commercially available polyglycerine ester or sorbitan ester.

EXAMPLES 11 TO 14 AND COMPARATIVE EXAMPLE 3

Powder (1,000 g) obtained from trimming and polishing of an intermediate smoke-dried product ("arabu-shi") in the production of "katsuo-bushi" was extracted with supercritical $CO_2$ at a temperature of 40° C. under a pressure of 200 kg/cm$^2$ and the extract was separated at room temperature under atmospheric pressure to obtain an oily "katsuo-bushi" flavor (62 g).

The remaining powder residue (900 g) was extracted with hot water at 95° C. for 2 hours and the resulting water soluble extract was concentrated under reduced pressure to obtain a water soluble concentrated "katsuo-bushi" extract paste having a water content of 38% (yield: 22%).

According to the formulations shown in Table 4, edible compositions were prepared by admixing the above oily "katsuo-bushi" flavor (A), the above concentrated "katsuo-bushi" extract paste (B), the mackerel peptide extract obtained in the same manner as in Examples 1 to 4 (C) and/or a commercially available sugar fatty acid ester (D: RyotoSugar Ester S-1570) and adding water to the mixture to adjust the total volume to 100 ml. Water dispersibility of each composition was evaluated according to the same criteria as in Table 3.

TABLE 4

| Ex. No. | Formulations (%) A | B | C | D | Dispersibility Period after preparation 0 hr. | 24 hrs. | 48 hrs. | 1 week | 1 month |
|---|---|---|---|---|---|---|---|---|---|
| Ex. 11 | 1.0 | 10 | 30 | 0.1 | O | O | O | O | O |
| Ex. 12 | 1.0 | — | 50 | — | O | Δ | Δ | Δ | Δ |
| Ex. 13 | 1.0 | — | 60 | — | O | O | O | O | O |
| Ex. 14 | 1.0 | 40 | — | — | O | O | O | O | Δ |
| Comp. Ex. 3 | 1.0 | — | — | 0.1 | Δ | X | X | X | X |

As seen from Table 4, the edible compositions wherein the water soluble concentrated "katsuo-bushi" extract (B) and/or the water soluble mackerel peptide (C) are added to the hydrophobic oily "katsuo-bushi" flavor (A) have stable and improved water dispersibility. These compositions have no clouding and excellent "katsuo-bushi" flavor and therefore they are used for additives for flavoring.

On the other hand, the sugar fatty acid ester cannot improve water dispersibility of the hydrophobic "katsuo-bushi" flavor, alone.

A similar result can be obtained by using another commercially available surfactant such as propylene glycol ester, sorbitan ester, etc.

EXAMPLES 15 TO 17 AND COMPARATIVE EXAMPLE 4

A coarsely ground ginseng (1,000 g) was extracted with supercritical $CO_2$ at a temperature of 39° C. under a pressure of 220 kg/cm$^2$ by using ethanol as an entrainer and the extract was separated at room temperature under an atmospheric pressure to obtain a ginseng flavor (23 g) containing various saponins.

The remaining ginseng residue (900 g) was extracted with hot water at 95° C. for 2 hours and the resulting water soluble extract was concentrated under reduced pressure to obtain a ginseng concentrated extract paste having a water content of 39% (yield: 15%).

According to the formulations shown in Table 5, edible compositions were prepared by admixing the above hydrophobic ginseng flavor (A), the ginseng concentrated extract (B) and/or a commercially available polyglycerine ester (C: SY Glystar MO-750 manufactured by Sakamoto Yakuhin Kyogo K.K., Japan) and adding water to the mixture to adjust the total volume to 100 ml. Water dispersibility of each composition was evaluated according to the same criteria as in Table 3.

TABLE 5

| Ex. No. | Formulations (%) A | B | C | Dispersibility Period after preparation 0 hr. | 1 week | 1 month |
|---|---|---|---|---|---|---|
| Ex. 15 | 1.0 | 50 | — | O | O | O |
| Ex. 16 | 1.0 | 10 | — | O | O | Δ |
| Ex. 18 | 1.0 | 10 | 0.05 | O | O | O |
| Comp. Ex. 3 | 1.0 | — | 0.05 | O | Δ | Δ |

As seen from Table 5, the edible compositions wherein the ginseng concentrated extract (B) alone or in combination with the sugar fattY acid ester (C) are added to the hydrophobic ginseng flavor (A) have improved water dispersibility.

Since the resulting edible composition not only contains various saponins having pharmacological activities but also has the unique fresh ginseng flavor, the edible composition has a very high commercial value.

EXAMPLE 18

A commercially available curry powder (800 g) was extracted with supercritical $CO_2$ at a temperature of 37° C. under a pressure of 200 kg/cm$^2$ and the extract was separated at room temperature under a reduced pressure to obtain an oily curry flavor (76 g).

The remaining curry powder (700 g) was extracted with hot water at 95° C. for 2 hours and the resulting extract was concentrated under reduced pressure to obtain a concentrated extract paste having the water content of 46% (yield: 22%).

The above oily curry flavor (1 g) was added to the latter extract paste (10 g). The mixture was thoroughly stirred and allowed to stand for 2 hours. Water was added to the mixture so that the final volume became 20 ml and the mixture was stirred to obtain a concentrated liquid curry flavor. This was suitably applied to add flavor to a ready to eat cooked curry.

What is claimed is:

1. A method of preparing an edible composition, said method comprising the steps of:
    (a) extracting an animal or plant natural raw material with a fluid at subcritical or supercritical conditions to obtain a hydrophobic edible material which is a member selected from the group consisting of alcohols having 24 to 34 carbon atoms, waxes, animal and plant fats and oils, vitamins, pigments, terpenoids, alkaloids, steroids, essential oils, fatty acids, oily flavor substances and hydrocarbons.
    (b) forming an admixture of said hydrophobic edible material a water soluble ingredient selected from the group consisting of water soluble peptides having a molecular weight of not more than 10,000 water soluble concentrated extracts and mixtures thereof.

2. The method according to claim 1, wherein the fluid at subcritical or supercritical conditions is $CO_2$.

3. The method according to claim 1, wherein the water soluble ingredient is water soluble peptide obtained by enzymatic hydrolysis of a raw material selected from the group consisting of fish and shellfish, seaweed, meat and plant seeds.

4. The method according to claim 1, wherein the water soluble ingredient is water soluble concentrated extract obtained by concentration of an extract of a raw material selected from the group consisting of fish and shellfish, seaweed, meat, fruits and juice, vegetables, plant seeds, plant roots, spices and seasonings.

5. The method according to claim 1, wherein said admixture is formed with said hydrophobic edible material in an amount such that said composition contains from 0.0001% to 50% by weight of said hydrophobic edible material based on the total weight of said composition.

6. The method according to claim 1, comprising also admixing a surfactant so that said composition further includes said surfactant.

7. The method according to claim 6, wherein said surfactant is a member selected from the group consisting of propylene glycol ester, monoglycerides, sorbitan esters, sugar fatty acid esters, polyglycerin ester and lecithin.

8. The method according to claim 1 wherein the extracting in step (a) is with a fluid at supercritical conditions.

9. The method according to claim 8, wherein said water soluble ingredient is mackerel peptide extract obtained by enzymatic hydrolysis of mackerel meat.

10. The method according to claim 9, wherein said animal or plant natural raw material is selected from the group consisting of sugar production of product, silver salmon gills and fins, chicken skin, and arabushi production by-product.

11. The method according to claim 10, wherein said fluid is $CO_2$.

12. The method according to claim 1, wherein said raw material of step (a) is also the source of said water soluble ingredient of step (b).

13. The method according to claim 12, wherein said raw material is selected from the group consisting of ground roasted coffee beans, ground ginseng and curry powder.

14. The method according to claim 13, wherein step (a) comprises extracting ground roasted coffee with $CO_2$ at subcritical conditions to obtain the hydrophobic edible material and a solid residue and the water soluble ingredient for step (b) is obtained by water extraction of solid residue.

15. The method according to claim 13, wherein step (a) comprises extracting ground ginseng with $CO_2$ at supercritical conditions to obtain the hydrophobic edible material and a solid residue and the water soluble ingredient for step (b) is obtained by water extraction of said solid residue.

16. The method according to claim 13, wherein step (a) comprises extracting curry powder with $CO_2$ at supercritical conditions to obtain the hydrophobic edible material and a solid residue and the water soluble ingredient for step (b) is obtained by water extraction of said solid residue or by water extraction of curry powder.

17. The method according to claim 9, wherein step (a) comprises extracting sugar production by-product with a fluid at supercritical conditions to obtain as the hydrophobic edible material a mixture of alcohols selected from the group consisting of alcohols having 24 to 34 carbon atoms.

18. The method according to claim 9, wherein step (a) comprises extracting silver salmon gills and fins with a fluid at supercritical conditions to obtain salmon oil as the hydrophobic edible material.

19. The method according to claim 9, wherein step (a) comprises extracting chicken skin with a fluid at supercritical conditions to obtain chicken oil extract as the hydrophobic edible materials.

20. The method according to claim 9, wherein step (a) comprises extracting arabushi production by-product with a fluid at supercritical conditions to obtain katsuo-bushi flavor oil as the hydrophobic edible material.

21. An edible composition which comprises (a) a mixture of higher alcohols comprising octacosanol and triacontanol obtained by extraction of sugar production by product with $CO_2$ at supercritical conditions and (b) mackerel peptide extract paste obtained by protease hydrolysis of mackerel meat.

* * * * *

UNITED STATES PATENT AND TRADEMARK OFFICE
CERTIFICATE OF CORRECTION

PATENT NO. : 4,981,699
DATED : January 1, 1991
INVENTOR(S) : SHOSHICHIRO INADA ET AL It is certified that error appears in the above-identified patent and that said Letters Patent is hereby corrected as shown below:

Claim 1 (column 11, line 7), after "composition" insert --having improved water solubility and dispersibility--.

Claim 1 (column 11, line 15), after "material" insert --with--.

Claim 10 (column 12, line 1), change "of product" to --by product--.

Signed and Sealed this

Twenty-eighth Day of April, 1992

Attest:

HARRY F. MANBECK, JR.

*Attesting Officer*  *Commissioner of Patents and Trademarks*